(12) United States Patent
Nakanishi et al.

(10) Patent No.: US 7,978,459 B2
(45) Date of Patent: Jul. 12, 2011

(54) ELECTRICAL JUNCTION BOX

(75) Inventors: Ryuji Nakanishi, Yokkaichi (JP);
Kazuhiro Asada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 12/382,808

(22) Filed: Mar. 24, 2009

(65) Prior Publication Data

US 2009/0298311 A1 Dec. 3, 2009

(30) Foreign Application Priority Data

May 30, 2008 (JP) .................................. 2008-143306

(51) Int. Cl.
*H01R 12/00* (2006.01)
(52) U.S. Cl. ..................... 361/622; 439/76.1
(58) Field of Classification Search ................. 439/76.1; 361/622

See application file for complete search history.

(56) References Cited

U.S. PATENT DOCUMENTS

| 7,233,495 | B2 | 6/2007 | Tomikawa et al. | |
| 7,314,629 | B2 * | 1/2008 | Zagury et al. | 424/204.1 |
| 7,408,765 | B2 * | 8/2008 | Kanou | 361/622 |
| 7,633,008 | B2 * | 12/2009 | Kanou | 174/50 |
| 2006/0003633 | A1 * | 1/2006 | Wada | 439/628 |

FOREIGN PATENT DOCUMENTS

JP A-2005-80370 3/2005

* cited by examiner

*Primary Examiner* — Truc T Nguyen
(74) *Attorney, Agent, or Firm* — Oliff & Berridge, PLC

(57) ABSTRACT

To provide an electrical junction box that has a simple construction and an improved waterproof capability. An electrical junction box 10 comprises a circuit casing 30 and a circuit board 20 contained in the circuit casing. The circuit casing includes two cover bodies 31 and 51, which are opposite each other and include base plate sections 32 and 52 and peripheral walls 41 and 61 provided on the base plate sections. Portions of the peripheral walls 41 and 61 are cut off to define drainage apertures 45 and 65, which is oriented downwards. Bus bars B to be electrically connected to electrical conductive paths on the circuit board 20 are insert-molded in connectors 110 to 160 and arranged downward. Contacting portion K between the peripheral walls 41 and 61 is sealed through the entire periphery with the exception of the drainage aperture 45.

11 Claims, 12 Drawing Sheets

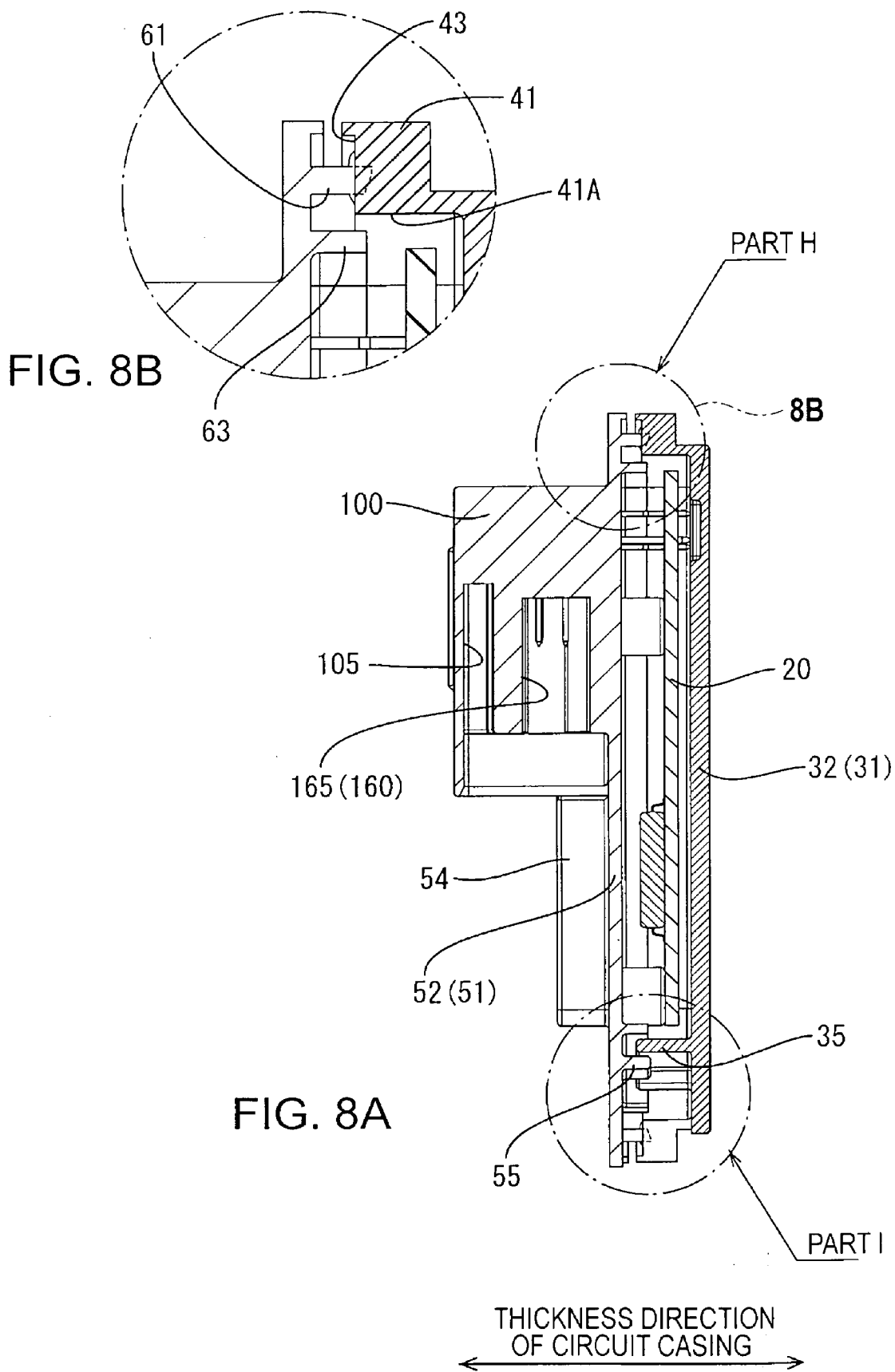

THICKNESS DIRECTION OF CIRCUIT CASING

ELECTRICAL JUNCTION BOX

CROSS REFERENCE TO RELATED APPLICATIONS

The present invention claims priority to JP 2008-143306 filed in Japan on May 30, 2008, the entire disclosure of which is hereby incorporated by reference in its entirety.

BACKGROUND

1. Technical Field

This invention relates to an electrical junction box.

2. Background Art

Heretofore, an electrical junction box has been mounted on, for example, a motor vehicle to energize or deenergize on-vehicle electrical components such as lamps, audio equipments, and the like. An example of the electrical junction box has been disclosed in JP 2005-80370A. The electrical junction box includes a casing body having a bottom wall and a side wall, a circuit board contained in the casing body so that the circuit board is overlapped on the bottom wall of the casing body, and a connector housing that is mounted on an upper edge of the side wall of the casing body and is adapted to be coupled to a mating member. In the electrical junction box, electronic parts are mounted on the circuit board, and a portion of the circuit board to be waterproofed is covered with a blocking layer formed by hardening a liquid resin material for waterproofing in order to waterproof the circuit board.

The electrical junction box described above has many parts and is difficult to manufacture. The electrical junction box is waterproofed by covering the box with a blocking layer formed by hardening the liquid resin material for waterproofing. This type of construction creates a certain amount of waterproofing even if a substantial amount of water flows into the casing body. However, although the circuit board is covered with the blocking layer, it is preferable to avoid exposing the electrical junction box to water for an extended time.

In view of the above problems, an object of the present invention is to provide an electrical junction box that has a simple construction and a superior waterproofing.

SUMMARY

An electrical junction box in accordance with the present invention comprises a circuit casing and a circuit board that mounts electrical components and is contained in the circuit casing. The circuit casing includes a first cover body and a second cover body. The first cover body has a base plate section provided on an outer periphery with a peripheral wall. The first and second cover bodies are opposite each other so that the peripheral wall of the first cover body is in contact with the second cover body. The electrical junction box is attached to a given support section so that the circuit board is mounted in a vertical direction. A portion of the peripheral wall is cut off to define a drainage aperture. Bus bars to be electrically connected to electrical conductive paths on the circuit board are insert-molded in connectors. The connectors are integrally formed on either of the cover bodies so that the openings for the coupling ports are directed downward. A contacting portion between the peripheral wall of the first cover body and the second cover body is sealed through the entire periphery.

The following constructions are preferable as embodiments of the present invention.

A sealing treatment for the contacting portion between the peripheral wall of the first cover body and the second cover body is applied to the entire periphery of the circuit casing except the drainage aperture. According to this construction, water more hardly enters the circuit casing, resulting in a superior waterproof construction.

The drainage aperture is provided on a lower part of the peripheral wall. The circuit casing is formed into a V-shaped configuration such that it is inclined away from the drainage port. According to this construction, even if water condenses on the interior of the circuit casing, the water can be smoothly drained through the drainage aperture to the outside.

The connectors are provided on an upper part of the cover body. According to this construction, for example, when the electrical junction box is contained and used in a box, even if the box containing the electrical junction box is immersed in water, it takes a long time for water to reach the connector block 100, thereby constructing a durable structure against exposure to water.

Bus bars to be connected to a ground line on the circuit board are united in a special-purpose connector different from connectors containing the other bus bars. According to this construction, a short circuit is hardly caused between the bus bars in comparison with the case where many bus bars having different electrical potentials are contained together in the same connectors. This is effective.

BRIEF DESCRIPTION OF THE DRAWINGS

FIG. 8A is a cross section view of the electrical junction box taken along lines D-D in FIG. 5;

FIG. 8B is an enlarged view of FIG. 8A taken along the dash-dot-dash line.

DETAILED DESCRIPTION OF EMBODIMENTS

According to the present invention, the contacting portion between the first cover body and the second cover body constituting the circuit casing are sealed through the entire periphery. In addition, the connectors are integrally formed on the cover body. Thus, there is substantially no clearance in the circuit casing, preventing water droplets from entering the casing, resulting in a high waterproof casing.

Because water generated in the circuit casing on account of dew formation is drained smoothly through the drainage aperture to the outside, the water is hardly stored in the circuit casing. Furthermore, the electrical junction box comprises only three parts including the circuit board and the two cover bodies of the circuit casing. Accordingly, the electrical junction box of the present embodiment reduces the number of parts and cost of manufacturing compared with conventional electrical junction boxes.

According to the present invention, the coupling ports of the connectors on the cover body 51 are directed downward. Thus, even if water falls onto the electrical junction box 10, for example, upon car-washing, the water will flow on the outer wall of the connectors and then naturally drips down. Consequently, water hardly enters the hoods and the coupling surfaces between the connectors.

Figure 1:
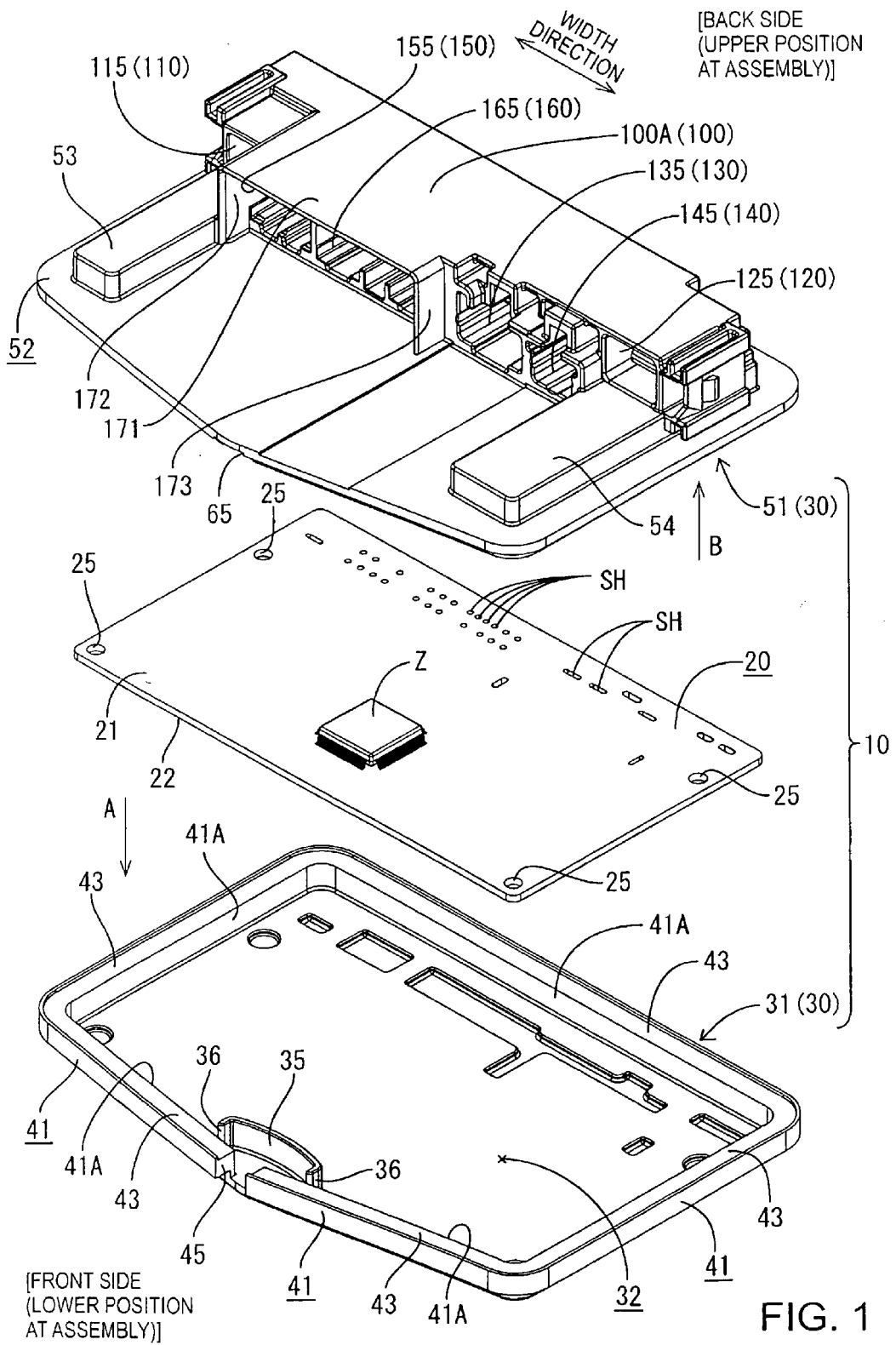
FIG. 1 is an exploded perspective view of an embodiment of an electrical junction box in accordance with the present invention.
Figure 2:
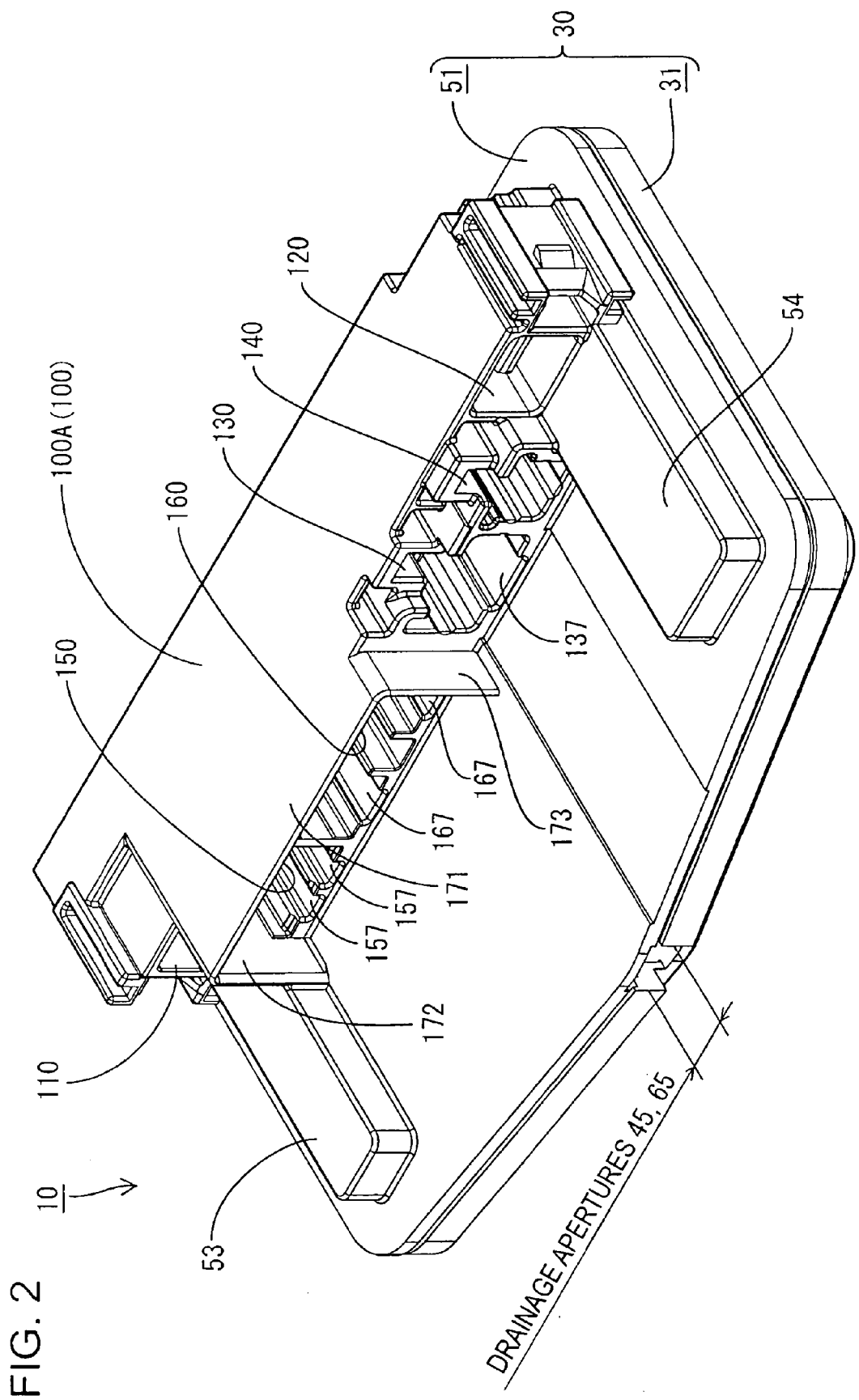
FIG. 2 is a perspective view of the electrical junction box shown in FIG. 1.
Figure 3:
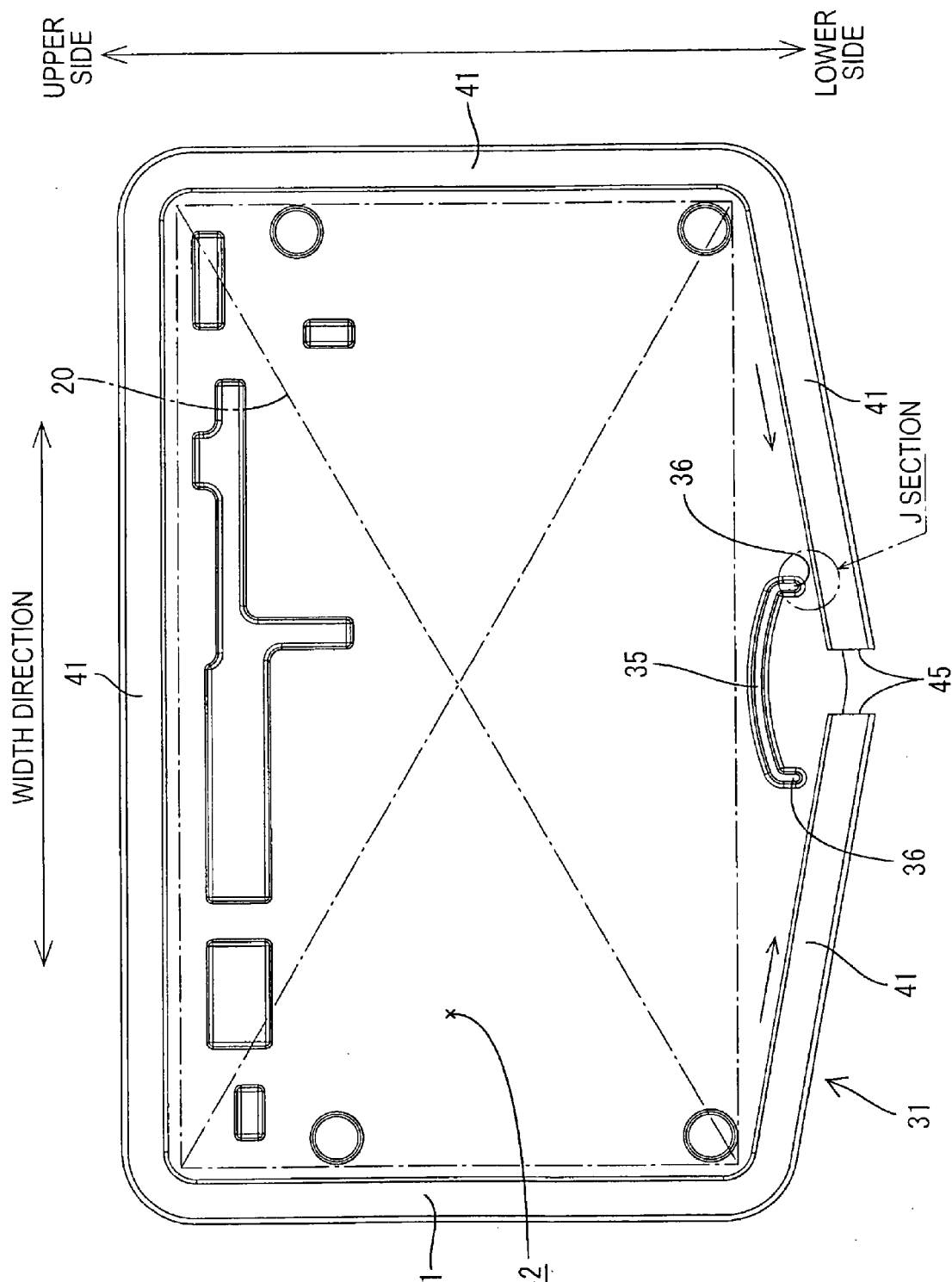
FIG. 3 is a front elevation view of a rear surface side cover body taken in a direction shown by an arrow A in FIG. 1.
Figure 4:
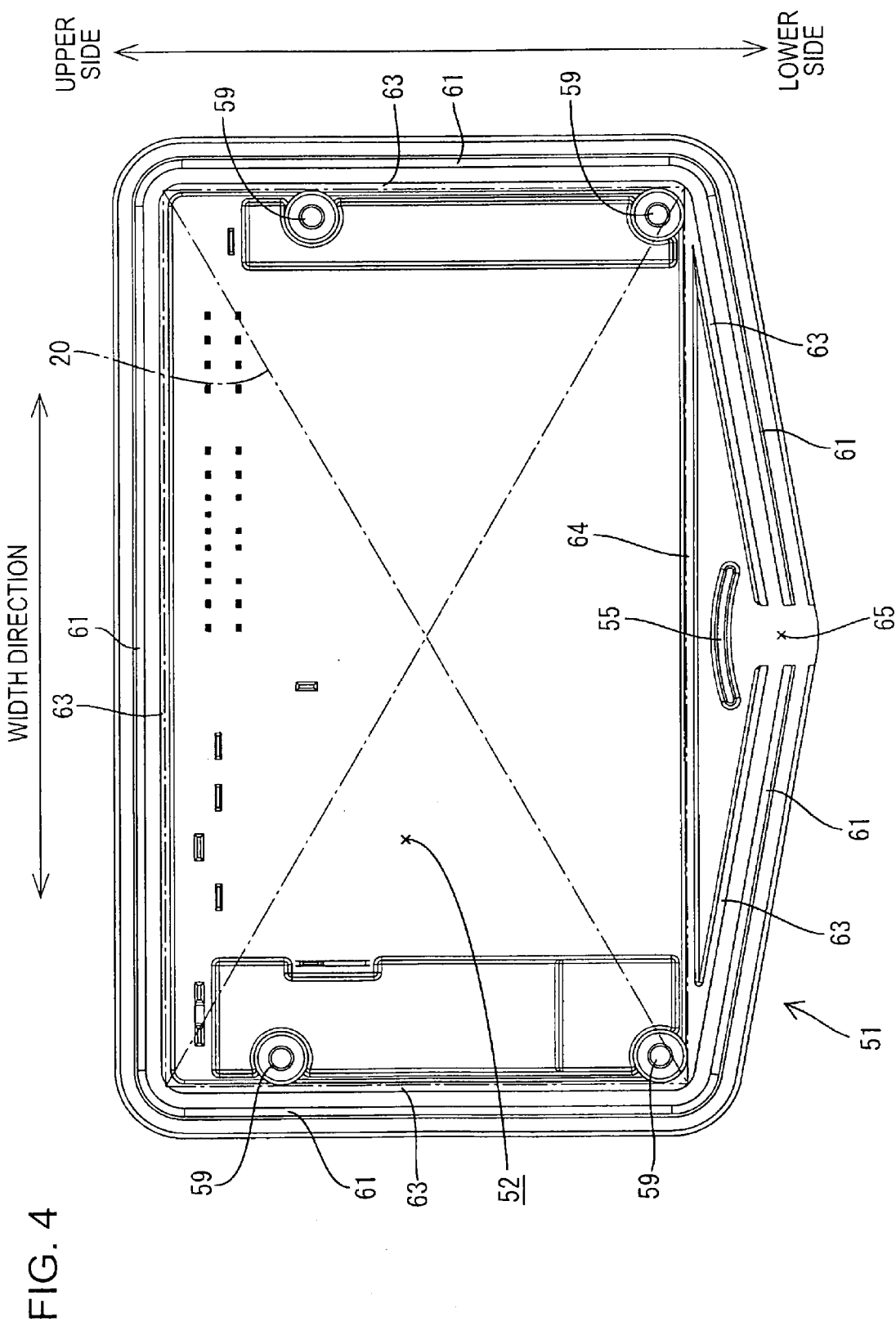
FIG. 4 is a front elevation view of a front surface side cover body taken in a direction shown by an arrow B in FIG. 1.

Referring now to FIGS. 1 to 12, an exemplary embodiment of an electrical junction box 10 to be mounted on a motor vehicle will be described below. FIG. 1 is an exploded perspective view of an embodiment of an electrical junction box 10 in accordance with the exemplary embodiment. FIG. 2 is a perspective view of the electrical junction box. FIG. 3 is a front elevation view of a rear surface side cover body taken in a direction shown by an arrow A in FIG. 1. FIG. 4 is a front elevation view of a front surface side cover body taken in a direction shown by an arrow B in FIG. 1.

As shown in FIG. 1, the electrical junction box 10 includes a circuit board 20 and a circuit casing 30. The circuit board 20 includes a rectangular printed board on which electrical conductive paths are formed by a printed wiring process, and an electronic part Z such as a semiconductor relay or the like mounted on the printed board. The circuit board 20 is covered with a moisture-proof insulation coating (a thin film formed by spraying a liquid resin material) after mounting the electronic part Z on the printed board. Even if water adheres to the circuit board on account of dew formation, the moisture-proof coating can prevent water from affecting an electrical performance of the circuit board. In the circuit board 20, a surface (upper surface in FIG. 1), on which the electrical part Z is mounted, is defined as a front surface side 21 and an opposite surface is defined as a rear surface side 22.

The circuit casing 30 contains the entire circuit board 20 and includes two divided cover bodies, namely a rear surface side cover body 31 (corresponding to a "first cover body" of the present invention) that encloses the rear surface side 22 of the circuit board 20 and a front surface side cover body 51 (corresponding to a "second cover body" of the present invention) that encloses the front surface side 21 of the circuit board 20. Detailed structures of both bodies 31 and 51 will be described below in due order from the rear surface side cover body 31 to the front surface side cover body 51.

The rear surface side cover body 31 is made of a synthetic resin material and includes a plate-like base plate section 32 and a peripheral wall 41 projecting upward along a peripheral edge of the base plate section 32. The rear surface side cover body 31 is formed into a generally shallow tray-like configuration. FIG. 3 shows a front elevation view of the rear surface side cover body 31 when the cover body 31 is taken in a direction shown by an arrow A in FIG. 1. As shown in FIG. 1, the base plate section 32 of the rear surface side cover body 31 is greater than the circuit board 20 (illustrated by an alternate long and short dash line in FIG. 3). The base plate section 32 projects a lower end central portion to form a generally pentagonal shape.

The peripheral wall 41 formed on the peripheral edge of the base plate section 32 is continuous through the entire periphery, except the lower end central portion. The peripheral wall 41 serves as a side wall for enclosing an outer periphery of the circuit board 20. The cutout lower end central portion in the peripheral wall 41 serves as a drainage aperture 45. Thus, since the rear surface side cover body 31 is provided on a lower end part with the drainage aperture 45, it is possible to drain water in the circuit casing 30 outside. In addition, because the lower wall of the base plate section 32 is formed into a V-shaped slope that gradually declines from opposite sides in a casing width direction to the drainage aperture 45, it is possible to efficiently drain water in the circuit casing 30.

The base plate section 32 is provided with a blocking wall 35 disposed under an attaching position (shown in an alternate long and short dash line in FIG. 3) of the circuit board 20. The blocking wall 35 may be disposed on a central part of the base plate section 32 in a width direction and above the drainage aperture 45. The blocking wall 35 together with a blocking wall 55 (described below) of the front surface side cover body 51 serve to restrain water from entering (backflowing into) the circuit casing 30 from an underside through the drainage aperture 45.

As shown in FIG. 3, the blocking wall 35 may be formed into an arcuate shape that is curved toward the drainage aperture 45. A width of the blocking wall 35 (a width in right and left directions in FIG. 3) should be sufficiently greater than a width of the drainage aperture 45 (about two times in this embodiment). Right and left side walls 36 of the blocking wall 35 extend downward and clearances between the side walls 36 and the peripheral wall 41 are very small.

The front surface side cover body 51 is made of a synthetic resin material and may be formed into the substantially same shape as that of the rear surface side cover body 31, as shown in FIG. 4. The front surface side cover body 51 includes a base plate section 52 that is the same shape as that of the base plate section 32 of the rear surface side cover body 31. The configuration of the base plate section 52 of the front surface side cover body 51 is similar to that of the rear surface side cover body 31. The base plate section 52 of the front surface side cover body 51 is greater than the circuit board 20. The base plate section 52 projects a lower end central portion to form a generally pentagonal shape. The base plate section 52 may be provided on an inner surface opposed to the base plate section 32 with four support bosses 59 each having a screwed hole so as to secure the circuit board 20 to the base plate section 52 by a screw.

Figure 7:
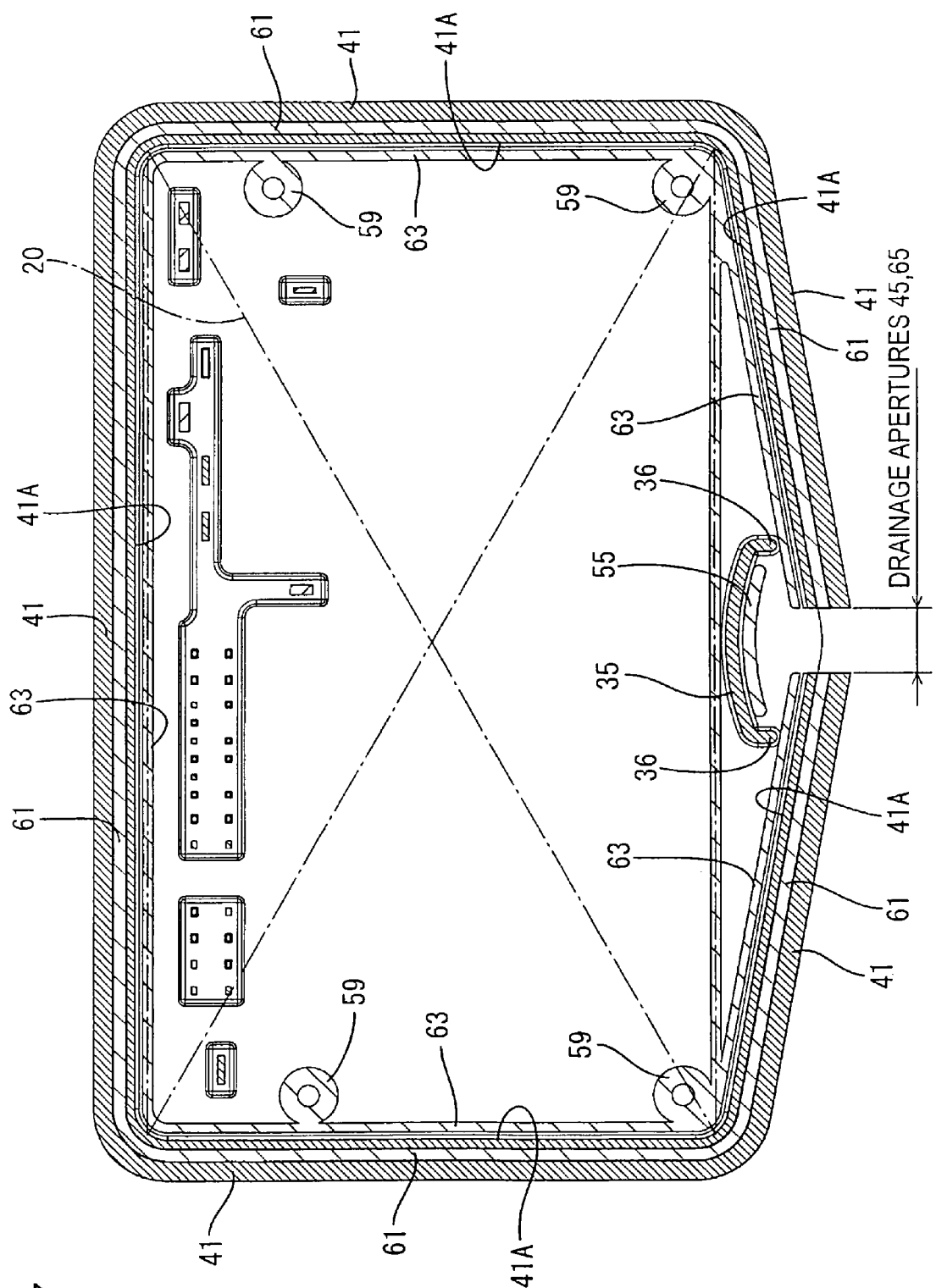
FIG. 7 is a longitudinal section view of the electrical junction box taken along lines E-E in FIG. 6.

The base plate section 52 may be provided on an inner surface with a peripheral wall 61 formed continuously through the entire periphery, except for the location of the drainage aperture 65. The base plate section 52 may be further provided on the inner surface inside the peripheral wall 61 with a peripheral wall 63 so that the peripheral wall 63 is spaced away from the peripheral wall 61 by a given distance. Furthermore, a partition wall 64 may be provided on the inner surface of the base plate section 52 so that two support bosses disposed on a lower part, as shown in FIG. 4, are connected to each other by the partition wall 64. As shown in FIG. 7, the inside peripheral wall 63 of the base plate section 52 serves to position the cover bodies 31, 51 on a horizontal plane when the inside peripheral wall 63 contacts with an inner periphery 41A of the peripheral wall 41 of the base plate section 32.

The drainage aperture 65 in the front surface side cover body 51 has the same width as that of the drainage aperture 45 in the rear surface side cover body 31 and is disposed on the same position as that of the drainage aperture 45 in the rear surface side cover body 31. Both drainage apertures 45, 65 are aligned with each other, as shown in FIG. 7, when both cover bodies 31, 51 are fitted on each other while the inside peripheral wall 63 of the front surface side cover body 51 is fitted to the inner periphery 41A of the peripheral wall 41 of the rear surface side cover body 31, both drainage apertures 45, 65 are aligned with each other, as shown in FIG. 7.

When both cover bodies 31 and 51 are aligned with each other, a distal end of the peripheral wall 61 of the front surface side cover body 51 contacts with a distal end surface 43 of the peripheral wall 41 of the rear surface side cover body 31 (the peripheral wall 61 is overlapped on the peripheral wall 41 in FIG. 7). Both cover bodies 31 and 51 are secured to each other by a vibration welding process. The peripheral wall 61 is provided on a distal end with a taper portion (illustrated by a broken line in a circular part H in FIGS. 8A and 8B so that the distal end can be easily melted upon welding. Since both cover bodies 31 and 51 do not have openings in their respective base plate sections 32 and 52, the entire circuit casing, with the exception of the drainage apertures 45 and 65, is sealed by the vibration welding process.

Figure 9A:
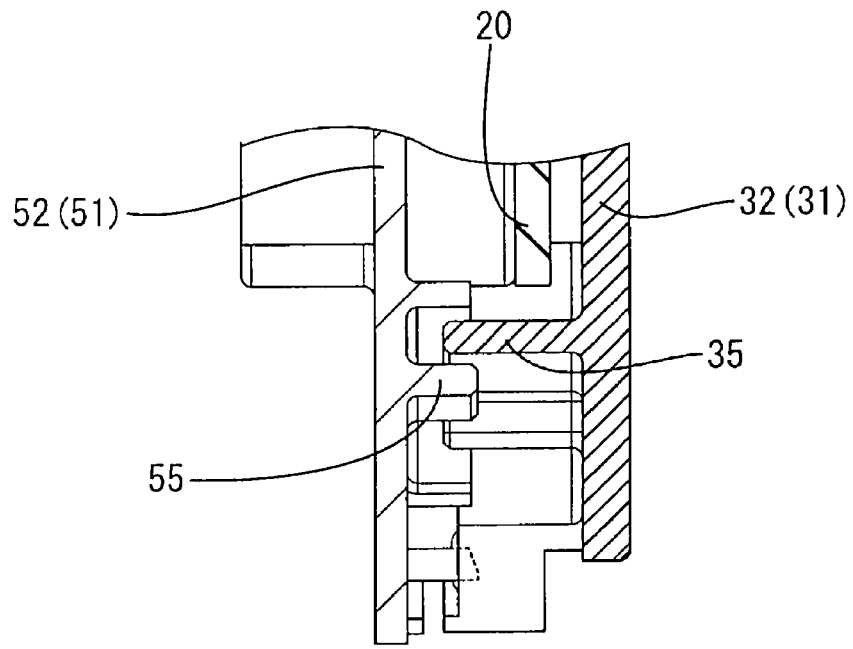
FIG. 9*a* is an enlarged cross section view of a part I of the electrical junction box in FIG. 8.

A blocking wall 55 is provided above the drainage aperture 65 of the base plate section 52. The blocking wall 55 is curved downward, as shown in FIG. 4. A width of the blocking wall 55 (a with in right and left directions in FIG. 4) is greater than that of the drainage aperture 65 but the width of the blocking wall 55 is smaller than that of the blocking wall 35 of the rear surface side cover body 31. The blocking wall 55 should be placed lower than the corresponding blocking wall 35. Thus, as shown in FIG. 7, when both cover bodies 31 and 51 are aligned with each other, both blocking walls 35 and 55 do not interfere with each other in the horizontal plane, and the blocking wall 55 is contained at the lower side of the blocking wall 35. Both blocking walls 35 and 55, as shown in FIG. 9a, overlap at the distal ends in a thickness direction of the circuit casing 30 (in right and left directions in FIG. 9).

Figure 9B:
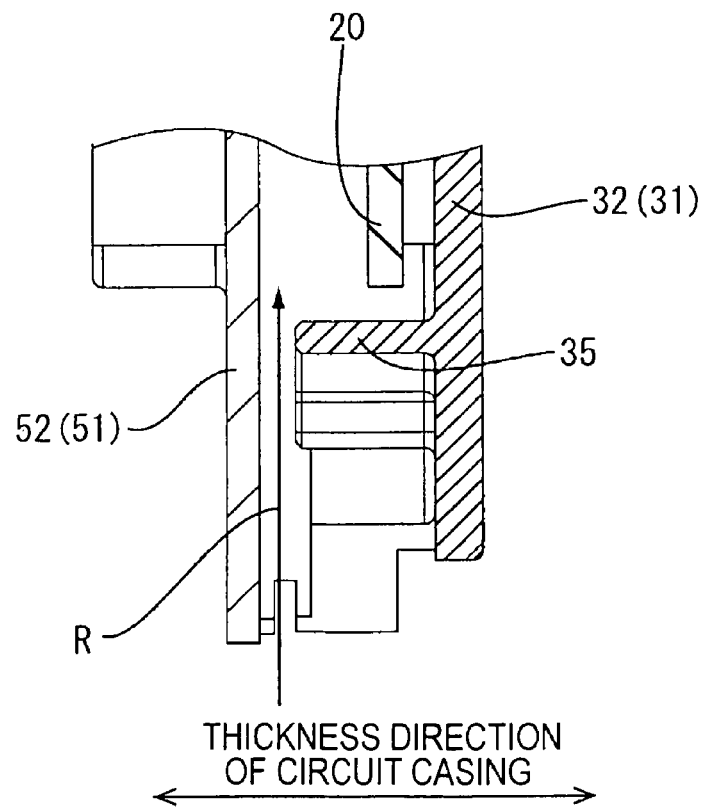
FIG. 9*b* shows a comparative example.

Embodiments in which the blocking wall is provided on only one of the cover bodies, as shown in FIG. 9b, a clearance is defined between the base plate 52 and the distal end of the blocking wall 35 to permit water to enter the clearance. However, because the blocking walls 35 and 55 are provided on the respective cover bodies 31 and 51 with respective distal ends overlapping as in the present embodiment, any clearance is not defined, thereby effectively preventing water from entering the circuit casing 30 (illustrated by an arrow R in FIG. 9b).

The base plate section 52 of the front surface side cover body 51 should be provided on an outer surface with a pair of seat portions 53 and 54 that are disposed on opposite sides in a width direction of the cover body 51 and extending from a back side to a forward side, as shown in FIG. 1. The base plate section 52 is also integrally provided on the outer surface with an elongate connector block 100 extending through the entire width of the base plate section 52. The connector block 100 is provided with six hoods 115 to 165 that are juxtaposed in the width direction to define six connectors 110 to 160 (see FIG. 6). The hoods 115 to 165 of the connectors 110 to 160 should be provided in a forward side (a lower side when the electrical junction box 10 is mounted on a motor vehicle) as shown in FIG. 1, with coupling ports that receive mating connectors. The mating connectors are coupled to the coupling ports by assembling the mating connectors upward to the connectors 110 to 160.

Figure 10:
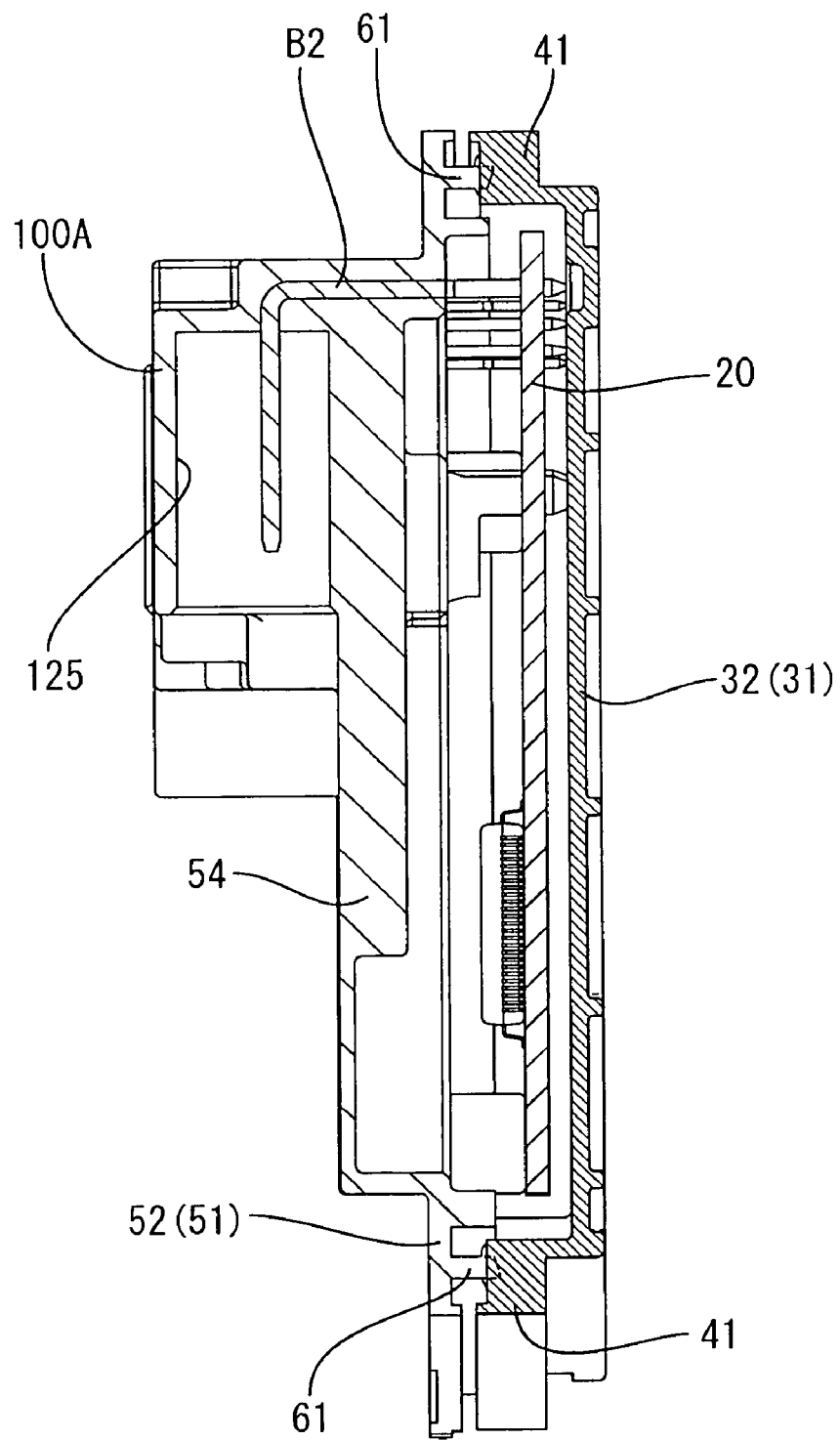
FIG. 10 is a cross section view of the electrical junction box taken along lines F-F in FIG. 6.

The connector block 100 is provided on each of the hoods 115 to 165 with insert-molded bus bars B1 to B6. Each of the bus bars B1 to B6 should be constructed of a metal plate and formed into an L-shaped configuration. As shown in FIG. 10, one end of each of the bus bars B1 to B6 should project into each of the hoods 115 to 165. The other end of each of the bus bars B1 to B6 should be drawn to a side of the circuit board 20 to be inserted into each through-hole SH (FIG. 1) in the circuit board 20.

Thus, because the connector block 100 is integrally formed with the connectors 110 to 160 to the front surface side cover body 51, the circuit casing 30 that covers the circuit board 20 forms an airtight seal. Specifically, when the connector block 100 is not integrally formed on the circuit casing 30 such that the connectors 110 to 160 are made of different parts, a clearance may be generated between coupling portions of the cover bodies 31 and 51 which allows water to enter the circuit casing 30. In contrast, in the present embodiment, the connector block 100 with connectors 110 to 160 is integrally formed on the circuit casing 30 such that there is no subsequent gap formed in the circuit casing 30, thereby enhancing an airtight function of the circuit casing 30.

The other walls of the connector block 100 are closed except the lower surface walls in which the coupling ports are formed, which also serves to enhance the airtight function of the circuit casing 30.

Figure 6:
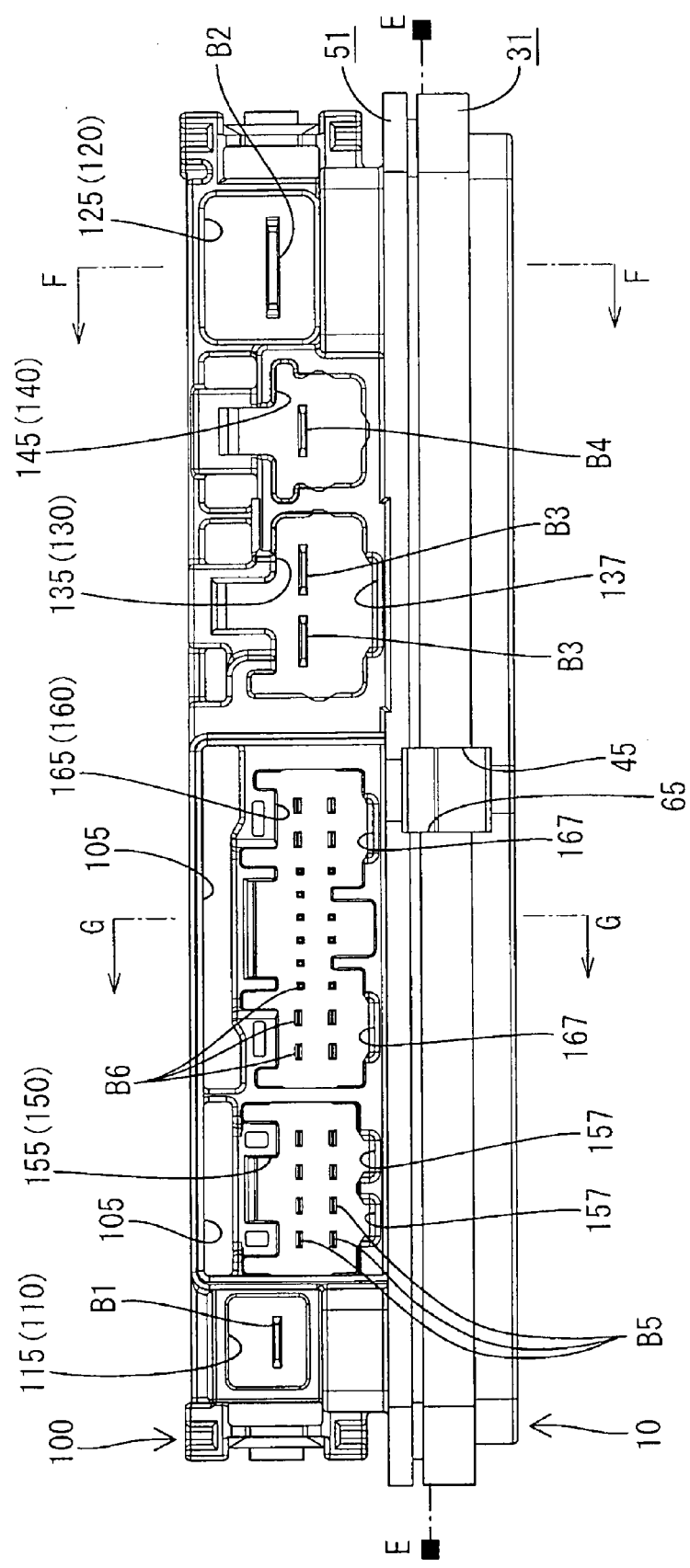
FIG. 6 is a side elevation view of the electrical junction box taken in a direction shown by an arrow C in FIG. 5.

The respective connectors 110 to 160 juxtaposed laterally are briefly described below. The connectors on the opposite sides, in the width direction, are defined as input side electrical power source connectors 110 and 120. As shown in FIG. 6, the input side electrical power source connectors 110 and 120 are provided on the seat portions 53 and 54 with predetermined widths and disposed on the base plate section 52. The input side electrical power source connectors 110 and 120 are disposed at a position higher than the outer surface of the base plate section 52 in comparison with the other connectors 130 to 160.

Each of the input side electrical power source connectors 110 and 120 should have a single pole. Mating connectors (not shown) to be connected to an on-vehicle battery (not shown) and an alternator (not shown) are coupled to the input side electrical power source connectors 110 and 120.

The reference numeral 130 in FIG. 6 designates a GND connector having two poles and the reference numeral 140 designates an output side electrical power source connector having a single pole. The GND connector 130 serves to electrically connect a ground line (not shown) of the circuit board 20 to a ground surface such as a chassis. A connector to be electrically connected to the chassis is coupled to the GND connector 130. The output side electrical power source connector 140 supplies an electrical power to an electrical component (not shown). A connector to be electrically connected to a circuit of the electrical component is coupled to the output side electrical power source connector 140.

The connectors 150 and 160 shown in FIG. 6 are signal output connectors and apply control signals to the electrical component (not shown). Connectors to be electrically connected to circuits of the electrical component are coupled to the connectors 150 and 160.

Figure 11:
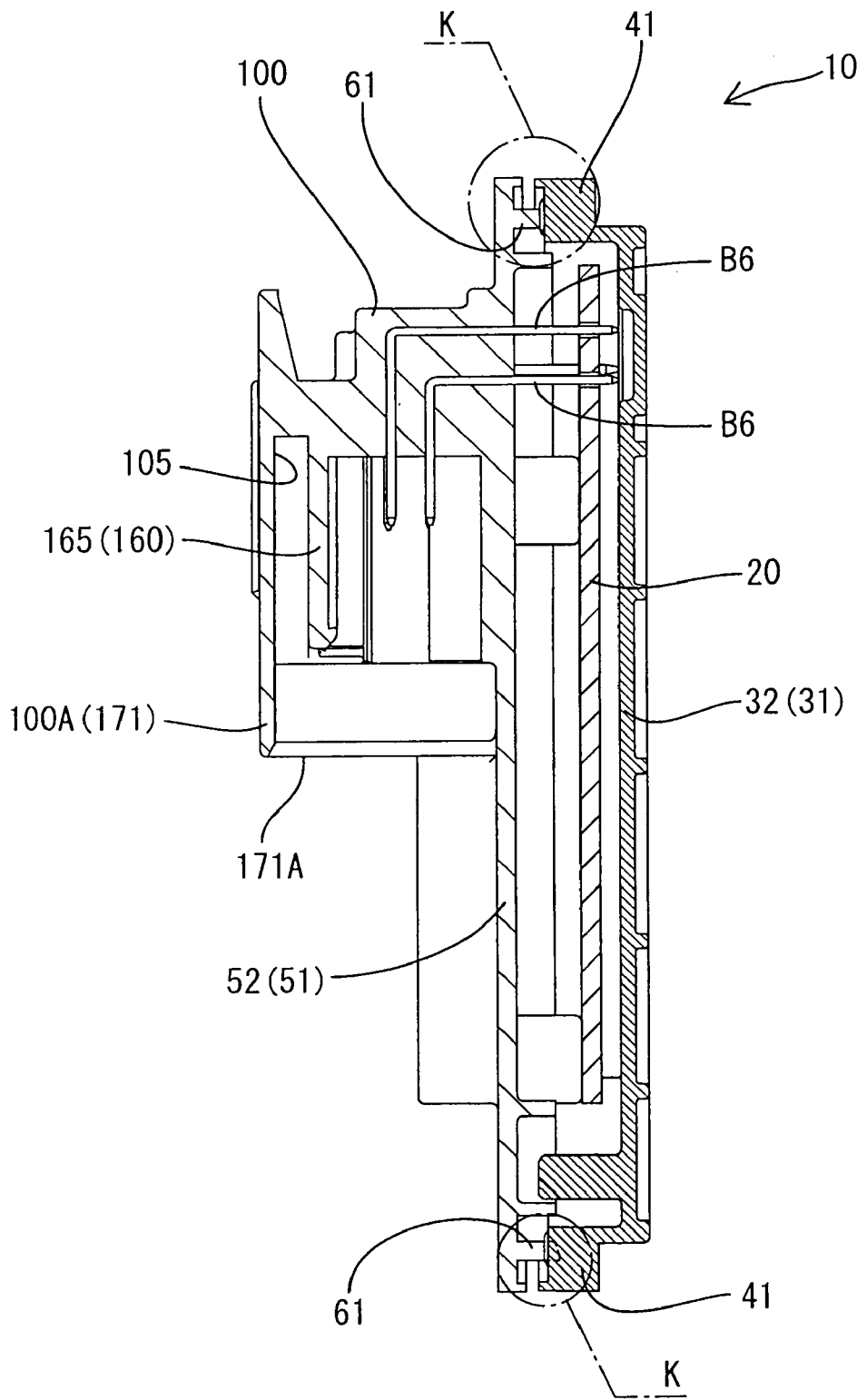
FIG. 11 is a cross section view of the electrical junction box taken along lines G-G in FIG. 6.

In the present embodiment, an outer wall 100A of the connector block 100 forms an outer peripheral wall of, for example, the input side electrical power source connector 120 (see FIG. 10). As shown in FIGS. 6 and 11, cavities 105 are defined between the outer wall 100A of the connector block 100 and the connectors 150 and 160. The outer wall 100A of the connector block 100 together with the hoods 155 and 165 doubly enclose the mating connectors coupled to the signal output connectors 150 and 160 (see FIG. 12). Hereinafter, a first surrounding wall 171 designates a portion of the outer wall 100A of the connector block 100 that doubly encloses the mating connectors in cooperation with the hoods 155 and 165 of the connectors 150 and 160.

Figure 12:
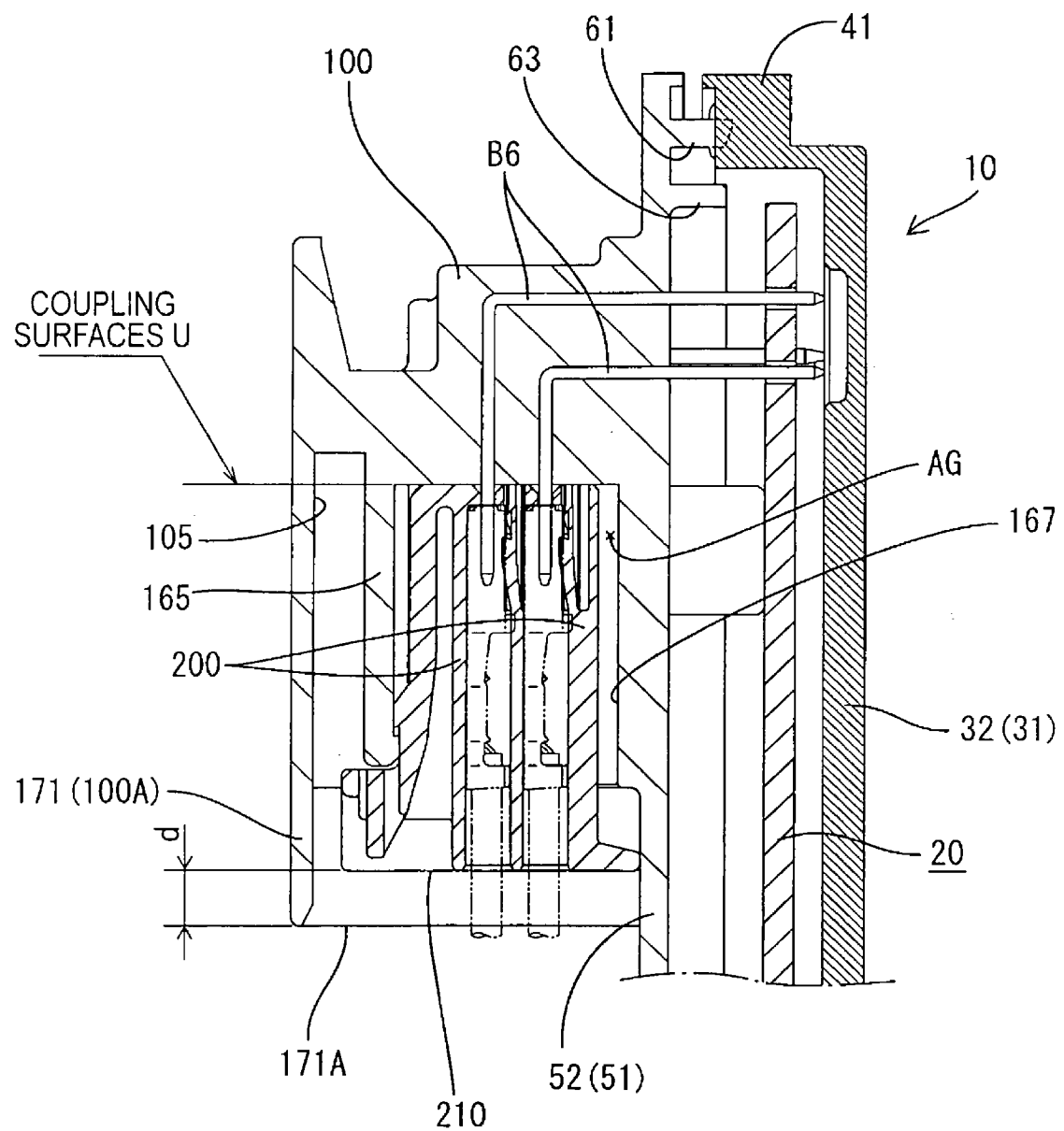
FIG. 12 is a cross section view of the electrical junction box similar to FIG. 11, illustrating a hood of the electrical junction box on which a mating connector is fitted.

A lower end 171A of the first surrounding wall 171 extends to a position lower than the lower ends 210 of mating connectors 200 which are coupled to the signal output connectors 150 and 160 by a predetermined distance (in the present embodiment the predetermined distance d is shown in FIG. 12). The entire mating connectors 200 coupled to the signal output connectors 150 and 160 can therefore be contained in a space defined inside the first surrounding wall 171.

As shown in FIG. 1, the first surrounding wall 171 is adjacent to a second surrounding wall 172 and a third surrounding wall 173 at the opposite sides in the width direction of the wall 171. The second surrounding wall 172 extends downward from a left wall of the connector 150 and the third surrounding wall 173 extends downward from a right wall of the connector 160. These three surrounding walls 171 to 173 surround together three directions of the mating connectors to be coupled to the signal output connectors 150 and 160. As shown in FIGS. 1 and 2, lower ends of the second surrounding wall 172 and third surrounding wall 173 are disposed at the same position in height as the lower end of the first surrounding wall 171 in a vertical direction.

Connectors having two or more poles of the bus bars B out of the connectors 110 to 160 (in more detail, the GND connector 130 and signal output connectors 150, 160) are provided with recesses 137, 157, 167 on inner walls of the hoods 135, 155, 165 (in more detail, bottom walls at the nearest position of an outer surface of the base plate section 52 and in parallel to the outer surface), as shown in FIGS. 2 and 6. These recesses 137, 157, 167 have given widths and depths, respectively, and communicate with the coupling ports of the hoods 135, 155, 165. When the mating connectors 200 are fitted into the hoods 135, 155, 165, air gaps AG are defined between the recesses 137, 157, 167 and outer wall surfaces of the mating connectors 200 (see FIG. 12).

The structures of the respective members 20, 31, and 51 that constitute the electrical junction box 10 are described above. Next, a process for assembling the electrical junction box 10 will be described below. Firstly, it is necessary to secure the circuit board 20 to the front surface side cover body 51 in order to carry out the assembling process. As shown in FIG. 1, the surface 21 of the circuit board 20, on which the electronic part Z is mounted, is directed to the front surface side cover body 51, the respective through-holes 25 in the circuit board 20 are positioned on the support bosses 59 provided on the front surface side cover body 51, and the circuit board 20 is secured to the support bosses 59 by screws. Thus, the circuit board 20 is fixed on the base plate section 52 of the front surface side cover body 51 with the circuit board 20 being raised from the surface of the base plate section 52 by a height of the support bosses 59. Under this condition, the respective bus bars B1 to B6 of the respective connectors 110 to 160 insert-molded on the front surface side cover body 51 are inserted into the through-holes SH in the circuit board 20. The bus bars are insert-molded by placing them in the mold for the cover prior to the introduction of the melted synthetic resin material. As the synthetic resin is injected into the mold, a tight seal is formed between the casing and the bus bars.

Thereafter, the bus bars B1 to B6 are soldered to the through-holes SH in the circuit board 20 to be electrically connected to electrical conductive paths (not shown) on the circuit board 20.

Next, as shown in FIG. 1, the circuit board 20 is directed downward and the front surface side cover body 51 is overlapped onto the rear surface side cover body 31. Under this condition, the inner peripheral wall 63 out of the two peripheral walls 61 and 63 provided on the front surface side cover body 51 is fitted onto the inner periphery 41A on the peripheral wall 41 of the rear surface side cover body 31 while the outer peripheral wall 61 contacts with the distal end surface 43 on the peripheral wall 41 of the rear surface side cover body 31. In more detail, the outer peripheral wall 61 of the front surface side cover body 51 contacts with the distal end surface 43 on the peripheral wall 41 of the rear surface side cover body 31 through the entire peripheries of the cover bodies except the drainage apertures 45 and 65.

Then, an attachment (not shown) clamps the entire outer peripheries of both cover bodies 31, 51 so that a vibration welding apparatus may apply vibrations to the cover bodies 31, 51. As a result, the distal end of the peripheral wall 63 of the front surface side cover body 51 are melted by frictional heat due to vibrations and is joined to the peripheral wall 41 of the rear surface side cover body 31.

Thus, the peripheral walls 41 and 61 of the rear and front surface side cover bodies 31 and 51 are overlapped onto each other to define a contacting portion K (see FIG. 11). The contacting portion K is joined without forming any clearance through the entire periphery (area # in FIG. 5), except the drainage apertures 45 and 65. Similarly, the circuit casing 30 is sealed through the entire periphery except the drainage apertures 45 and 65. In other words, there is no clearance in the entire circuit casing 30 except the drainage apertures 45 and 65, thereby preventing water from entering the interior space that houses the circuit board 20. Under this condition, as shown in FIG. 8A, the circuit board 20 is disposed in the interior of the rear surface side cover body 31 in a thickness direction of the circuit casing 30 and water droplets on the circuit board 20 caused by dew formation can be collected on the rear surface side cover body 31.

Figure 5:
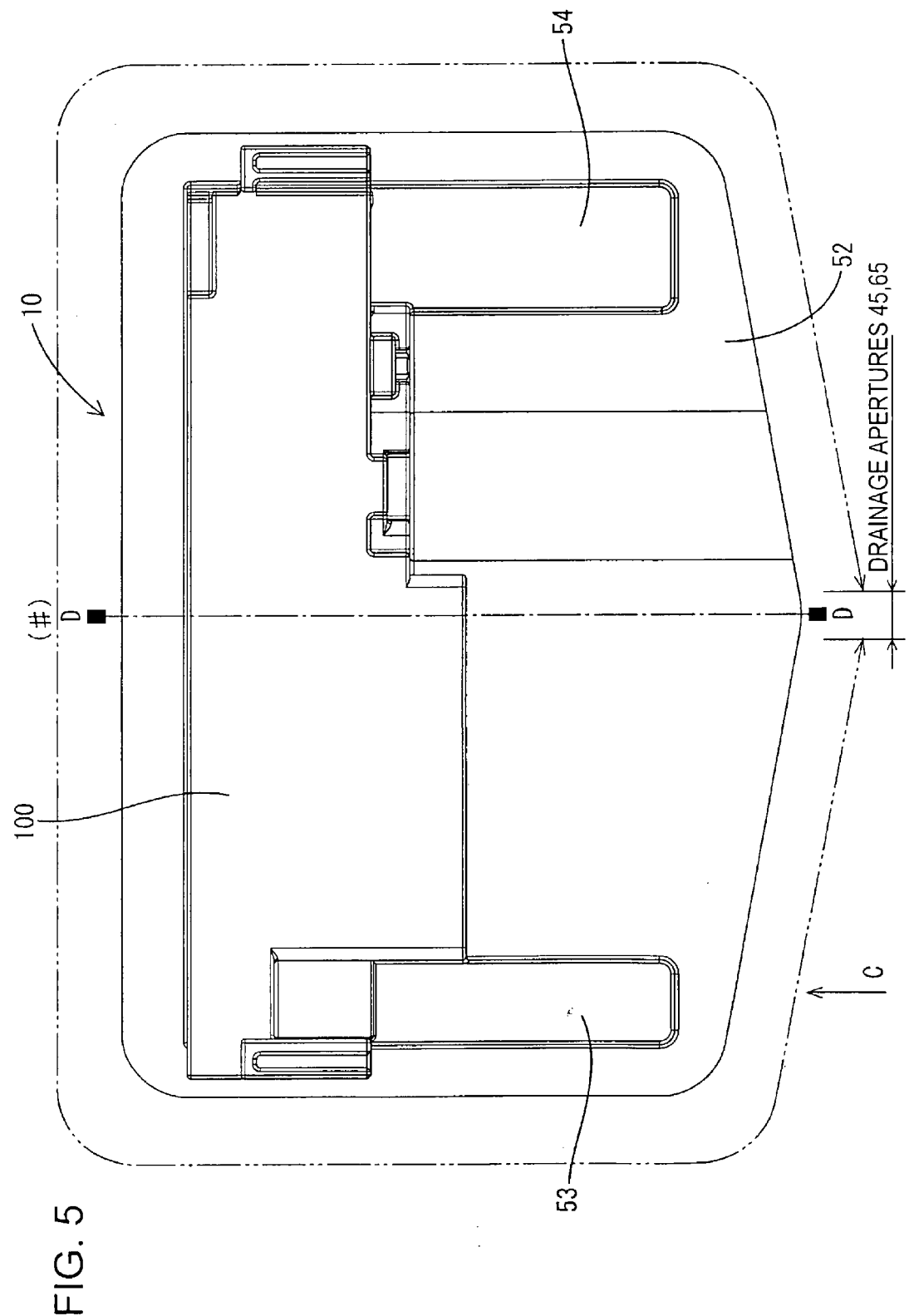
FIG. 5 is a front elevation view of the electrical junction box of the present invention.

The electrical junction box 10 assembled above is mounted in a box (not shown, corresponding to a support section) in an engine compartment of a motor vehicle so that the circuit board 20 stands up in the electrical junction box 10 in a vertical direction (see FIG. 5).

Thus, when the electrical junction box 10 is attached to the box, the respective mating connectors connected to electrical power sources or electrical components, can be coupled to the hoods 115 to 165 of their respective connectors 110 to 160. In this manner it is possible to supply and distribute an electrical power through the electrical junction box 10 to the respective electrical components, and the electrical junction box 10 thereby controls switching of the electrical power supply.

Next, operation and benefits of the present embodiment of the electrical junction box is described below.

According to the electrical junction box 10, the contacting portion K between the both cover bodies 31 and 51 constituting the circuit casing 30 are sealed around the entire periphery (except for the drainage apertures 45 and 65). In addition, the connector block 100 is integrally formed on the front surface side cover body 51. Thus, there is substantially no clearance in the circuit casing 30 except for the drainage apertures 45 and 65, so that water droplets cannot enter the casing 30, thereby creating a very waterproof construction.

The circuit casing 30 is provided in a lower part with the drainage apertures 45 and 65, and is formed into a V-shaped configuration that it inclines away from the opposite the drainage apertures 45 and 65. According to this structure, condensation in the circuit casing 30 drains smoothly outward through the drainage apertures 45 and 65 (mainly through the drainage aperture 45) and is essentially moisture free in the circuit casing 30. In the present embodiment, the circuit casing 30 also has blocking walls 35 and 55 which further assist in preventing water from entering the circuit casing 30 through the drainage apertures 45 and 65 and thereby creating a superior waterproof structure.

The electrical junction box 10 comprises only three parts including the circuit board 20, and the cover bodies 31 and 51 which make up the circuit casing 30. Accordingly, the electrical junction box 10 of the present embodiment reduces the number of parts and lowers cost in comparison with the conventional electrical junction box.

According to the electrical junction box 10 of the present embodiment, the openings of the coupling ports of the connector block 100 on the front surface side cover body 51 are directed downward. Thus, even if water falls onto the electrical junction box 10, for example, upon car-washing, the water will flow on the outer wall of the connector block 100 and naturally drops down by its weight. Consequently, the water hardly enters the hoods 115 to 160 and the coupling surfaces U (FIG. 12) between the connectors.

Since the connector block 100 is provided on the upper part of the front surface side cover body 51, even if the box containing the electrical junction box 10 is immersed in water, it takes a long time for water to reach the connector block 100, thereby constructing a durable structure against exposure to water.

In the present embodiment, two bus bars B4, B4 to be connected to the ground line of the circuit board 20 are united into the special-purpose connector, namely the GND connector 140 different from the connectors 110 to 130, 150, and 160 that contain the other bus bars B1 to B3, B5, and B6. According to this construction, even if water droplets enter the hood 135 of the GND connector 130 during using and the two bus bars B4, B4 are wetted, a current leak does not flow between the bus bars B4, B4, because the electric potential of the bus bars B4, B4 are equal to each other.

On the other hand, the signal output connectors 150 and 160 contain a plurality of bus bars B5, B6 and are provided with the surrounding walls 171 to 173. Accordingly, water rarely adheres to the outer wall of the hoods 155 and 156 and rarely enters the hoods 155 and 165.

It should be noted that the present invention is not limited to the embodiment described above and illustrated in the drawings. For example, the following embodiments will fall in the technical scope of the present invention.

Although the contacting portion K between the peripheral walls 41 and 61 becomes a coupling portion between the cover bodies 31 and 51 and the contacting portion K is welded and sealed by a way of vibrating the peripheral walls 41 and 61 of the cover bodies 31 and 51 in the present embodiment, the present invention is not limited to this embodiment. For example, an adhesive or a packing (rubber) may be applied to or interposed among the contacting portion K between the peripheral walls 41 and 61 to seal them.

Although the two cover bodies 31 and 51 constituting the circuit casing 30 are provided on the outer peripheries of base plate sections 32 and 52 with the peripheral walls 41 and 61 in the present embodiment, the present invention is not limited to this embodiment. Only one of the cover bodies may be provided with a peripheral wall while the other mating cover body may be provided with only a base plate section to form a flat configuration. Then, the one cover body may be overlapped onto the other mating cover body so that the peripheral wall of the one cover body contacts with the base plate section of the other mating cover body.

Although the six connectors 110 to 160 are united as the connector block 100 in the present embodiment, the present invention is not limited to this embodiment. The respective connectors 110 to 160 may be separated from one another in the circuit casing 30.

What is claimed is:

1. An electrical junction box comprises:
a circuit casing and a circuit board that mounts electrical components and is contained in said circuit casing, said circuit casing including a first cover body and a second cover body, said first cover body having a base plate section provided on an outer periphery with a peripheral wall, said first and second cover bodies arranged opposite each other so that said peripheral wall contacts with said second cover body,
said electrical junction box being attached to a given support section so that said circuit board stands up in a vertical direction, a portion of said peripheral wall being cut off to define a drainage aperture,
a contacting portion between said peripheral wall of said first cover body and said second cover body being sealed through the entire periphery,
a connector block integrally formed with either of the cover body including a plurality of connector compartments,
bus bars to be electrically connected to the electrical conductive paths on the circuit board being insert-molded in the connector compartments,
a first blocking wall disposed on the first cover body in a width direction above the drainage aperture, and
a second blocking wall disposed on the second cover body in the width direction above the drainage aperture, wherein one of the first blocking wall and the second blocking wall is curved-shaped to at least partially enclose the other blocking wall.

2. An electrical junction box according to claim 1, wherein a sealing treatment for said contacting portion between said peripheral wall of said first cover body and said second cover body is applied to the entire periphery of said circuit casing except said drainage aperture.

3. An electrical junction box according to claim 1, wherein said drainage aperture is provided on a lower part of said peripheral wall and said connector block is provided near an upper part of said peripheral wall.

4. An electrical junction box according to claim 1, wherein the connector compartments include coupling ports that are directed downward.

5. An electrical junction box according to claim 1, wherein a distal end of the first blocking wall that is opposite an end that is adjacent to the first cover body partially overlaps a distal end of the second blocking wall that is opposite an end that is adjacent to the second cover body.

6. An electrical junction box according to claim 2, wherein said drainage aperture is provided on a lower part of said peripheral wall, and said circuit casing is formed into a V-shaped configuration that is inclined from opposite sides in a the width direction toward said drainage.

7. An electrical junction box according to claim 6, wherein the connector compartments are provided on an upper part of said cover body.

8. An electrical junction box according to claim 6, wherein bus bars to be connected to a ground line on said circuit board are united in a special-purpose connector different from the connector compartments containing the other bus bars.

9. An electrical junction box according to claim 7, wherein bus bars to be connected to a ground line on said circuit board are united in a special-purpose connector different from the connector compartments containing the other bus bars.

10. A water resistant electric junction box for use outdoors, the electrical junction box comprising:
a first cover made of water resistant material the first cover comprising:
a flat surface having an inner side, an outer side, and a peripheral region along a circumference of the flat surface;
a peripheral wall extending transverse the flat surface around a majority of the peripheral region; and a drainage aperture defined by a portion of the peripheral region along which the peripheral wall does not extend;

a second cover made of water resistant material having an inner side and an outer side, the inner side of the second cover arranged adjacent to the peripheral wall such that a tight seal is formed between the peripheral wall and the second cover;

a circuit board having electrical conductive paths on which electrical components may be mounted, the circuit board attached to the inner side of either of the first cover and second cover;

a first blocking wall disposed on the first cover body in a width direction above the drainage aperture;

a second blocking wall disposed on the second cover body in the width direction above the drainage aperture, wherein one of the first blocking wall and the second blocking wall is curved-shaped to at least partially enclose the other blocking wall;

at least one connector port integrally formed on one of the outer side of the first cover or the outer side of the second cover, the connector port comprising:

a bus bar inject-molded into the one of the first cover or the second cover, the bus bar being electrically connected to the electrical conductive paths on the circuit board; and connector port walls integrally formed on the outside of the one of the first cover or the second cover, the connector port walls surrounding all sides of the bus bar except a side in a direction parallel to a direction of the drainage aperture.

11. An electrical junction box for use outdoors, the electrical junction box comprising:

a box having an inside and an outside, the box being made of a water resistant material and having a removable cover, a drainage aperture being formed on one side;

a circuit board having electrical conductive paths on which electrical components may be mounted, the circuit board being mounted within the box;

bus bars inject-molded into a side of the box, the bus bars being electrically connected to the electrical conductive paths on the circuit board;

a peripheral wall formed on the outside of the box, the peripheral wall surrounding all sides of the bus bar except an open side that is parallel to the side on which the drainage aperture is formed;

connectors being integrally formed on the outside of the box and inside the peripheral wall so that coupling ports in the connectors are directed toward the open side;

a first blocking wall disposed on the first cover body in a width direction above the drainage aperture, and a second blocking wall disposed on the second cover body in the width direction above the drainage aperture, wherein one of the first blocking wall and the second blocking wall is curved-shaped to at least partially enclose the other blocking wall.

* * * * *